United States Patent
Gailloux et al.

(10) Patent No.: US 8,244,290 B1
(45) Date of Patent: Aug. 14, 2012

(54) METHOD AND COMPUTER-READABLE MEDIUM FOR DATA OBJECT ATTACHMENT AND CHAINED SERIAL DISCUSSIONS WITH PUSH-TO-TALK

(75) Inventors: Mike Gailloux, Overland Park, KS (US); John Everson, Leawood, KS (US); Kenneth W. Samson, Belton, MO (US); Jeffrey Dillon, San Marcos, CA (US)

(73) Assignee: Nextel Communications, Inc., Reston, VA (US)

( * ) Notice: Subject to any disclaimer, the term of this patent is extended or adjusted under 35 U.S.C. 154(b) by 464 days.

(21) Appl. No.: 12/431,952

(22) Filed: Apr. 29, 2009

(51) Int. Cl.
*H04B 7/00* (2006.01)

(52) U.S. Cl. ......... 455/518; 455/516; 455/519; 455/59

(58) Field of Classification Search .............. 455/516, 455/518, 519, 526, 59; 340/7.45, 7.46, 7.51, 340/9.11
See application file for complete search history.

(56) References Cited

U.S. PATENT DOCUMENTS

| | | | | |
|---|---|---|---|---|
| 7,725,119 B2 * | 5/2010 | Kies | ............... | 455/518 |
| 2005/0232241 A1 * | 10/2005 | Wu et al. | ............... | 370/352 |
| 2006/0052127 A1 * | 3/2006 | Wolter | ............... | 455/519 |
| 2008/0198422 A1 * | 8/2008 | Casey et al. | ............... | 358/425 |
| 2010/0323742 A1 * | 12/2010 | Allen et al. | ............... | 455/519 |

\* cited by examiner

*Primary Examiner* — Temica M Beamer

(57) ABSTRACT

Methods and computer-readable mediums for processing push-to-talk voice messages are provided. According to one method, a first mobile station receives a push-to-talk voice message from a second mobile station, determines that a data object is attached to the push-to-talk voice message, determines a type of the data object, and stores the data object in a PTT attachment queue of the first mobile station, based upon the determined type of the data object, which may be a picture, video data, audio data, e-mail, document, contact, or the like.

6 Claims, 4 Drawing Sheets

METHOD AND COMPUTER-READABLE MEDIUM FOR DATA OBJECT ATTACHMENT AND CHAINED SERIAL DISCUSSIONS WITH PUSH-TO-TALK

BACKGROUND OF THE INVENTION

Wireless communication networks typically provide a number of different services, such as voice and data communication services. Most wireless communication networks typically offer a single type of voice communication service known as interconnect voice communication services (also referred to as circuit-switched voice communication services). Interconnect voice communication services provide a full-duplex communication between two communication endpoints.

Another type of voice communication service is push-to-talk voice communication service (also referred to as dispatch communication service), which involves a half-duplex communication between two communication endpoints. A push-to-talk call requires floor'control to ensure that only one endpoint has permission to talk at any particular time during the call. Push-to-talk communication services have historically been employed in private wireless communication networks by, for example, taxi cab companies or emergency service agencies (e.g., police and fire departments).

SUMMARY OF THE INVENTION

The present invention solves the above-mentioned problems of the prior art by providing a method and computer-readable medium that allow users to transmit data objects with push-to-talk (PTT) voice messages from their mobile devices to other users' mobile devices.

Methods according to the present invention allows users to send and receive data objects, such as pictures, video messages, audio messages, e-mails, contacts, documents and the like that can be stored in a PTT attachment queue of a mobile station, with push-to-talk voice messages. This will significantly improve the utility of the user's push-to-talk calling experience by allowing more efficient transmission of information among users.

In push-to-talk calling, users make and send voice messages to each other via their mobile stations. Currently, however, users cannot attach data objects (e.g., audio, video, picture, e-mail, contacts, document, etc.) to a push-to-talk message. Instead, they must be sent separately from push-to-talk voice messages using, for example, an e-mail, SMS or MMS message. Moreover, users cannot send data objects to a plurality of recipients at the same time.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
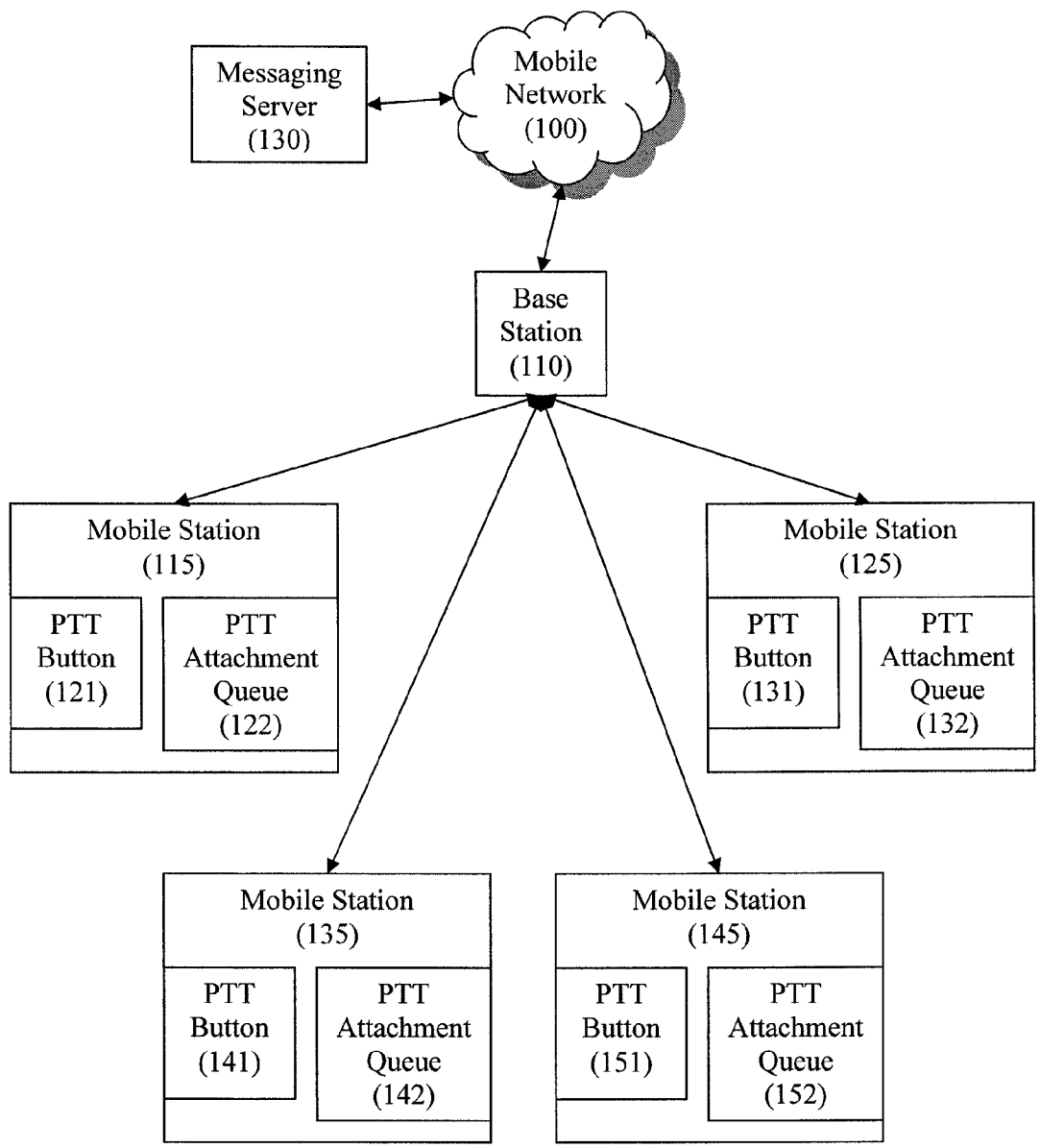
FIG. 1 illustrates an exemplary embodiment of a system in accordance with the present invention.

FIG. 1 illustrates an exemplary embodiment of a system in accordance with the present invention. The system includes a Mobile Network 100, Base Station 110, Mobile Stations 115, 125, 135 and 145, and Messaging Server 130. Mobile Stations 115, 125, 135 and 145 communicate in the Mobile Network 100 via an air interface through the Base Station 110. Mobile Stations 115, 125, 135 and 145 may be mobile telephones or the like that have the capability to perform push-to-talk communications. Mobile Stations 115, 125, 135 and 145 each include a PTT Button 121, 131, 141 and 151, and a PTT Attachment Queue 122, 132, 142 and 152, respectively, the operation of which is described below. The number of components illustrated in FIG. 1 is only exemplary, since the number of components (e.g., mobile stations, base stations and messaging servers) can be varied as desired.

The Messaging Server 130 is provided by a push-to-talk service provider to facilitate push-to-talk communications for mobile stations in the Mobile Network 100. The Messaging Server 130 can receive push-to-talk voice messages and data objects from users and forward them to the mobile stations of intended recipients. Additionally, the Messaging Server 130 can act as an originator of messages and data objects to be sent to users.

According to exemplary embodiments of the present invention, each mobile station includes a PTT attachment queue application which provides a PTT attachment queue for storing data objects, such as audio, video, pictures, e-mail, contacts, documents, and the like. Any time a mobile station creates or receives a data object, it is placed in the PTT attachment queue. In particular, the data objects may be placed in the PTT attachment queue automatically, i.e., without user intervention. The operation of the PTT attachment queue application may be entirely transparent to the user. Each of the different types of data (i.e., audio, video, picture, e-mail, contact, document, etc.) is stored in a different portion of the PTT attachment queue, which simplifies retrieval from the queue.

For example, the user may use the camera in his mobile station to create a picture. After the picture has been created, the user can choose between sending it to a recipient (e.g., another mobile station) or saving it. If the user chooses to send the picture, it is automatically placed in the PTT attachment queue. In particular, the picture is placed in a portion of the PTT attachment queue designated for storing pictures. The address information of the intended recipient(s) may be attached (e.g., appended) to the picture or stored separately. A corresponding procedure to send or save other types of data objects is performed when a data object of any other type is created or received. As described below, the data objects in the PTT attachment queue may remain there until the next push-to-talk voice message is sent. Accordingly, exemplary embodiments of the present invention reduce the amount of data traffic in the communications network by sending data objects with push-to-talk voice messages already occurring in the communications network instead of adding separate data traffic events to the network.

Figure 2:
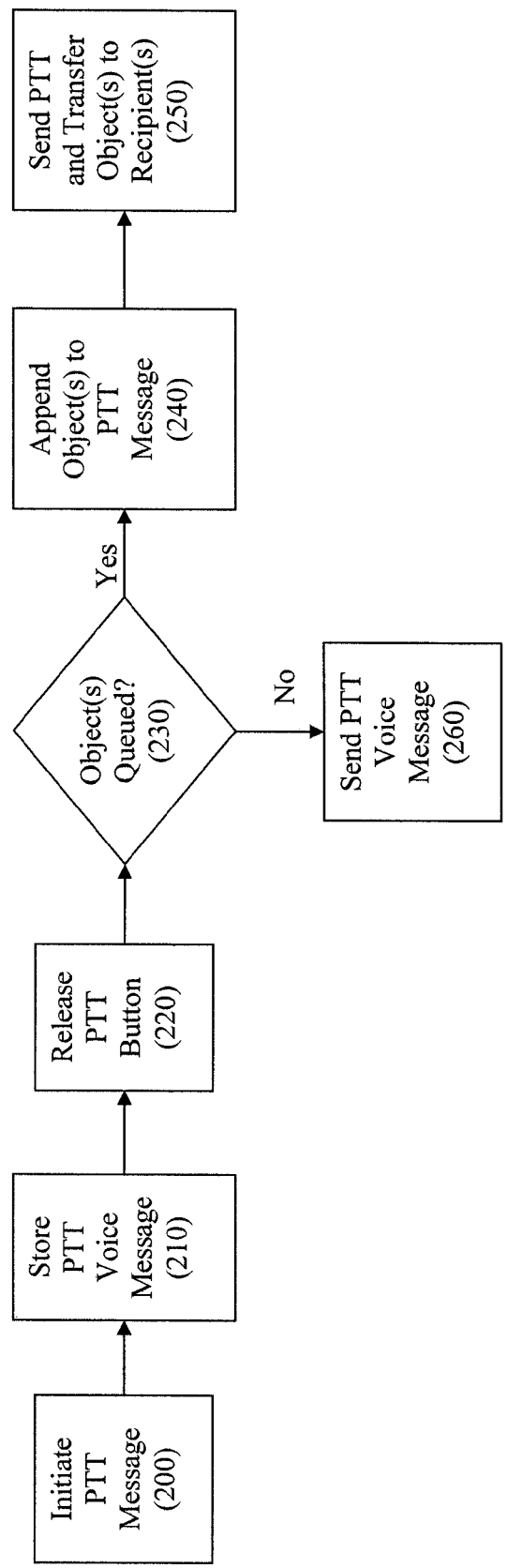
FIG. 2 illustrates an exemplary embodiment of a method for processing push-to-talk voice messages, in accordance with the present invention.

FIG. 2 illustrates an exemplary embodiment of a method for processing push-to-talk voice messages. In step 200, a Mobile Station 115 initiates a push-to-talk voice message when a PTT button 121 is pressed on the Mobile Station 115.

In step 210, a user's push-to-talk voice message, which is spoken into the Mobile Station 115 by the user, is stored in a PTT buffer of the Mobile Station 115. After the PTT button 121 is released in step 220, but before the push-to-talk calling session is ended, a PTT attachment queue 122 is checked for data objects (step 230).

If data objects are present in the PTT attachment queue 122, they are attached to the push-to-talk voice message in step 240 and sent to the intended recipient(s) in step 250. In particular, the data objects may be appended to the end of the voice data packets. Thus, the data objects and the push-to-talk message are sent simultaneously, i.e., in the same data transmission. The intended recipient(s) of the data object(s) can be the same as, or different from, the intended recipient(s) of the push-to-talk voice message.

Also, the PTT attachment queue 122 may be emptied when the push-to-talk voice message is sent. The data objects in the PTT attachment queue 122 may be wrapped in address data which indicates the address(es) of the recipient(s) of the data objects. Each data object can be sent to more than one recipient at a time, and multiple data objects can be sent to the same or different recipients with a single push-to-talk message. In addition to receiving data objects during normal operation of a mobile station while connected to (i.e., "ON") a network data objects can be accumulated in the PTT attachment queue 122 while a mobile station is "OFF" the network. When the mobile station is back "ON" the network, the data objects can be transmitted.

In an exemplary embodiment of the present invention, data objects can be forwarded from a first mobile station to a second mobile station, etc., such that a chain of data communication is formed, i.e., a chained serial discussion. In other words, a first mobile station may send a first push-to-talk voice message, for example, to a second mobile station, which may send the push-to-talk voice message to a third mobile station along with a second push-to-talk voice message appended to the first push-to-talk voice message. The third mobile station may then send a third push-to talk voice message, which may include the first and/or second push-to-talk voice messages, to a fourth mobile station, and so on. Thus, a chained serial discussion would be formed among the mobile stations. Although the foregoing example describes a chained serial discussion of push-to-talk voice messages, any other type of data object could be used instead of, or in conjunction with, the push-to-talk voice messages. Additionally, the data objects sent through the chained serial discussion could be sent to a group of mobile stations, rather than one mobile station at a time.

Figure 3:
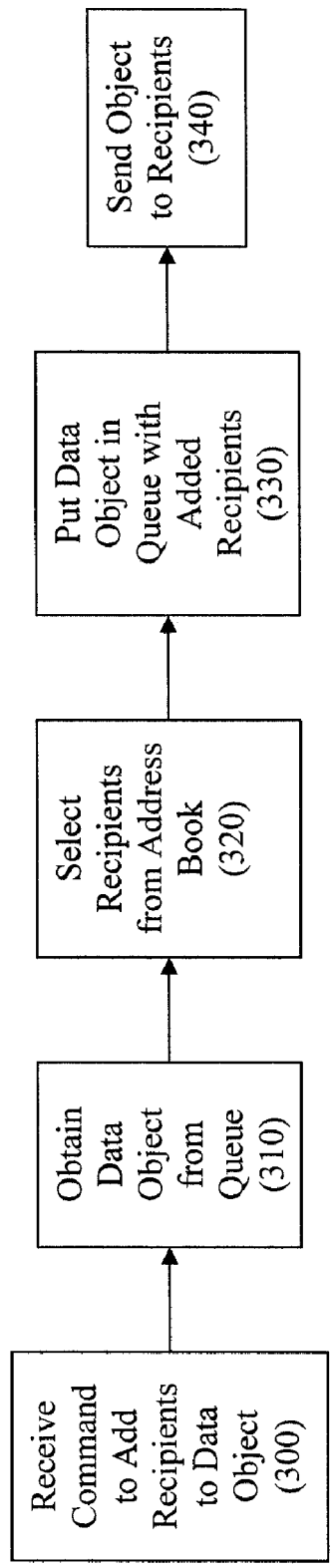
FIG. 3 illustrates an exemplary embodiment of a method for adding recipients to a data object in a PTT attachment queue, in accordance with the present invention.

FIG. 3 illustrates an exemplary embodiment of a method for adding recipients to a data object in a PTT attachment queue, in accordance with the present invention. In step 300, a command is received by the Mobile Station 115 to add recipients to a data object stored in the PTT attachment queue 122 of the Mobile Station 115. A PTT attachment queue application may automatically recognize particular data objects that should be sent to a plurality of additional recipients. Predetermined types of data objects or data objects received from a push-to-talk service provider, for example, may be predetermined as data objects that should be sent to other recipients. Alternatively, a user can choose to add additional recipients either manually or through the automatic process described above.

In particular, a push-to-talk service provider may send the data object to the Mobile Station 115, so that it will forward the data object to other users in the push-to-talk network. The service provider would likely choose to send promotional or other material to those users who perform a high level of push-to-talk messaging (known as "power users") within the network. Due to their high level of messaging, power users could quickly spread data objects through the network by contacting some of their frequent contacts. Those frequent contacts could continue to spread the data objects to other users in the network. Thus, a service provider could efficiently spread particular data objects to its users, such as promotional offers for free services. Alternatively, a user could efficiently spread its own data object to other users within the network. Moreover, since the data objects are transmitted with push-to-talk voice messages already occurring on the network, the amount of data traffic is minimized, despite the additional data objects being transmitted. In particular, messaging overhead is reduced by combining the data objects with push-to-talk voice messages.

In step 310, the data object identified in step 300 is obtained from the PTT attachment queue. In step 320, one or more recipients for the data object may be selected from an address book of the originator of the message. In this step, the recipients can be crossed-referenced in a push-to-talk call log to determine the frequency with which the Mobile Station 115 communicates with the additional recipients. The selection of data object recipients may be confirmed based upon whether they are frequent communicators. Then, in step 330, the data object, updated to include the additional recipients, is placed in the PTT attachment queue. In step 340, the data object is sent to the recipients with the next available push-to-talk voice message. Although this method was described in reference to one data object, a plurality of data objects may be sent to a plurality of recipients.

Figure 4:
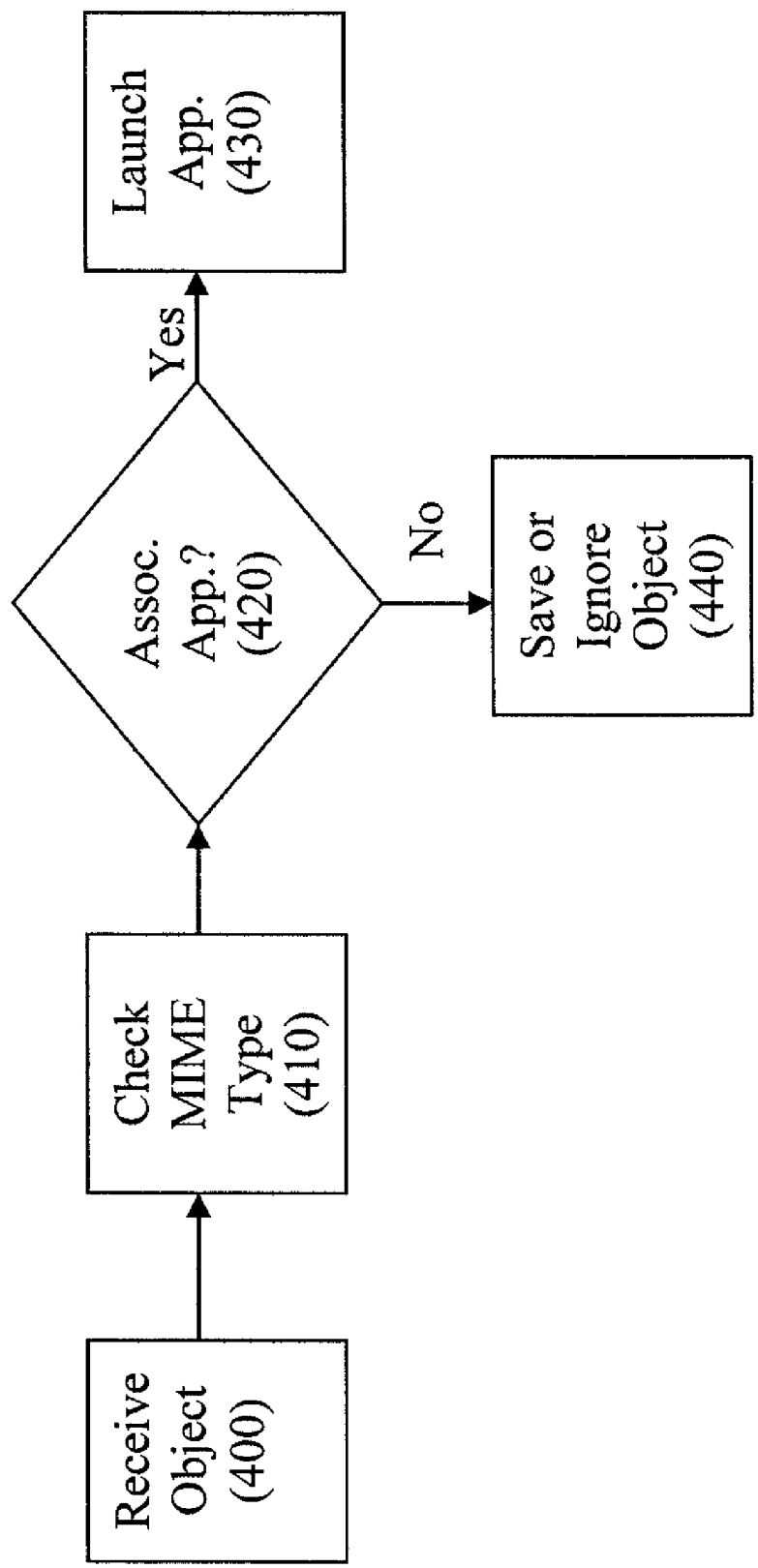
FIG. 4 illustrates an exemplary embodiment of a method for processing a received data object in a mobile station, in accordance with the present invention.

FIG. 4 illustrates an exemplary embodiment of a method for processing a received data object in a mobile station. In step 400, a transferred data object is received by the Mobile Station 125. In step 410, the Mobile Station 125 determines the MIME type of the data object. In step 420, it is determined whether there is an associated application on the Mobile Station 125 that can be used to view, listen to and/or feel (e.g., via vibrations, etc.) the data object. If there is such an application, then, in step 430, the application is launched to open the data object. If there is not such an application, then, in step 440, the data object is either saved or ignored. Whether the object is saved or ignored can be decided automatically, depending upon the characteristics of the data object, or can be decided manually by the recipient of the data object.

In other exemplary embodiments of the present invention, there is a computer-readable medium encoded with a computer program for processing push-to-talk voice messages, a computer-readable medium encoded with a computer program for adding recipients to a data object in a PTT attachment queue, and a computer-readable medium encoded with a computer program for processing a received data object in a mobile station.

The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program for processing push-to-talk voice messages is illustrated in FIG. 2, which is described above.

An exemplary embodiment of a computer-readable medium encoded with a computer program for adding recipients to a data object in a PTT attachment queue is illustrated in FIG. 3, which is described above.

An exemplary embodiment of a computer-readable medium encoded with a computer program for processing a received data object in a mobile station is illustrated in FIG. 4, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adding new recipients to a data object in a push-to-talk (PTT) attachment queue of a mobile station, comprising:
    retrieving the data object from the PTT attachment queue;
    selecting new recipients from an address book of the mobile station, based upon call data in a push-to-talk call log of the mobile station;
    attaching address data of the new recipients to the data object, thereby producing an updated data object; and
    storing the updated data object in the PTT attachment queue,
    wherein selecting the new recipients comprises determining whether the mobile station and the new recipients communicate frequently via push-to-talk voice messages.

2. The method of claim 1, further comprising:
    attaching the updated data object to a next push-to-talk voice message; and
    transmitting the updated data object to the new recipients.

3. The method of claim 1, wherein the data object originated from a push-to-talk service provider.

4. The method of claim 1, wherein the call data in the push-to-talk call log is obtained by:
    monitoring push-to-talk communications of the mobile station, including time of data, recipient, communication type and frequency of communication;
    storing information about the monitored communications; and
    determining a most likely time, destination and type of message to be sent by the mobile station, based on the stored information.

5. The method of claim 1, wherein the storing the updated data object in the PTT attachment queue comprises storing the updated data object in the PTT attachment queue when the mobile station is not connected to the network.

6. The method of claim 5, further comprising transmitting the updated data object to the new recipients when the mobile station is connected to the network after not being connected to the network.

* * * * *